(No Model.)

L. ROBERTSON.
MECHANICAL DENTISTRY.

No. 514,201. Patented Feb. 6, 1894.

Witnesses:
W. C. Jirdinston.
Harry F. Noking.

Inventor:
L. Robertson
per O. M. Hill
Attorney.

UNITED STATES PATENT OFFICE.

LUCIUS ROBERTSON, OF CINCINNATI, OHIO.

MECHANICAL DENTISTRY.

SPECIFICATION forming part of Letters Patent No. 514,201, dated February 6, 1894.

Application filed March 3, 1893. Serial No. 464,485. (No model.)

*To all whom it may concern:*

Be it known that I, LUCIUS ROBERTSON, a citizen of the United States, residing at Cincinnati, Hamilton county, State of Ohio, have invented certain new and useful Improvements in Methods of Forming a Soft-Rubber Ridge upon Vulcanite Dental Plates, of which the following is a specification, reference being had to the accompanying drawings.

The object and nature of my invention will be apparent from the description hereinafter given.

Figure 1:
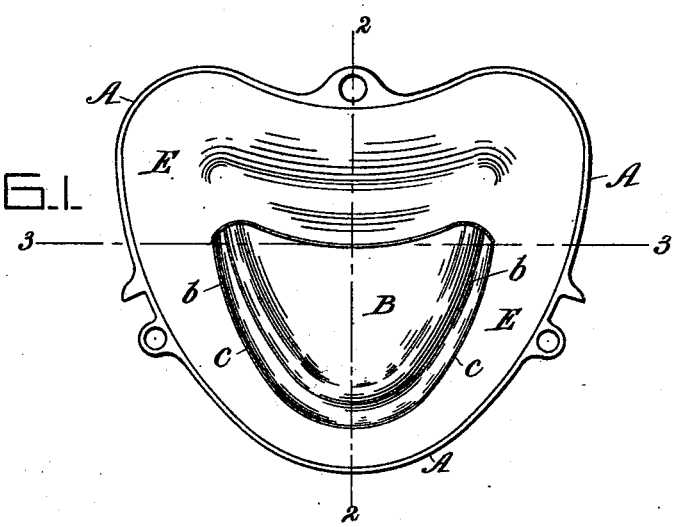
Figure 2:
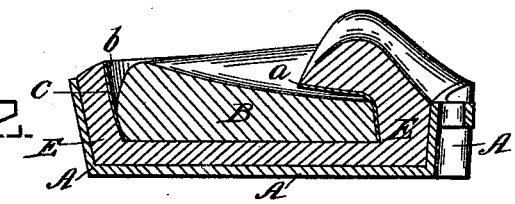
Figure 3:
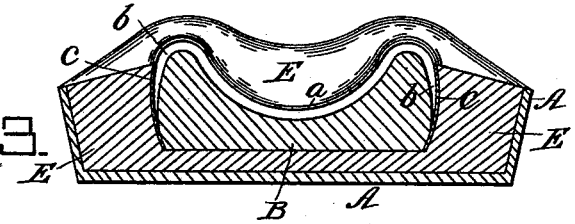
Figure 5:
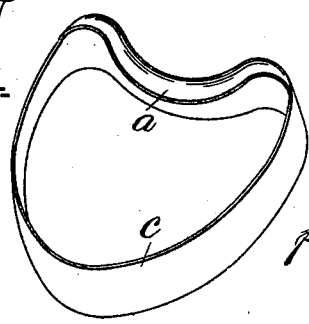
Figure 4:
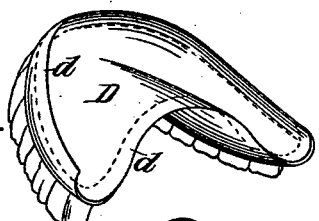

In the accompanying drawings: Figure 1, is a plan view of one portion of a flask provided with an impression or cast and a metallic packing-ring which are embodied in the apparatus for carrying out my improved method of forming the soft rubber or flexible ridge on a vulcanite dental plate. Fig. 2, is a section on dotted line 2, 2, of Fig. 1; and Fig. 3, is a section on dotted line 3, 3, of said Fig. 1. Fig. 4 is a perspective view of the packing-ring detached from its cast or impression. Fig. 5, is a perspective view of a dental plate provided with an outer flexible ridge or edge formed according to my improved method.

It is a well known fact that a set of teeth mounted upon a hard or vulcanized plate are quite difficult to keep in position within the mouth, especially while speaking or masticating food; this is especially true of the upper set of teeth.

The apparatus preferably employed for carrying out my improved method of forming a soft rubber ridge on a vulcanite plate, is that illustrated, in which A, represents one portion of the flask, and B, the cast or impression for forming the convex portion of the plate. The other portion of the flask which contains the plastic impression and teeth for the concave portion of the plate is not shown, the same being old and well-known in dentistry, and a part to which my invention does not pertain.

A suitable packing-ring, C, (preferably of metal) surrounds the upper edge of the cast, B,—a channel or space $b$ intervening between the top of said ring and cast, as shown, into which channel or groove the soft non-vulcanizable rubber or other analogous material is packed before the vulcanite plate is cast, in the usual manner. This packing-ring is preferably provided at rear with an inturned flange, $a$, which latter overlaps the rear portion of the cast, thus providing a packing-space into which the soft rubber is forced, and in this manner a flexible ridge is provided for the rear portion of the plate. The cast, B, and its packing-ring, C, are embedded within the flask and surrounded with a suitable plastic material, E, preferably gypsum. This plastic packing, when hardened, has a tendency to retain the packing-ring firmly and securely to place around its cast.

In operation, the soft non-vulcanizable rubber is forced within the channel, $b$; and, to properly pack this material, considerable force or pressure must be used. The packing-ring permits of any reasonable degree of pressure being applied to this soft rubber, and also provides for a smooth and finished surface to the ridge when thus formed, which latter feature is quite desirable for the comfort of the person using the set of teeth. Having filled the channel $b$ to the desired depth with the non-vulcanizable rubber in the manner aforestated, the vulcanite rubber is next applied in the usual manner, after which the two portions of the flask (one not being shown) are secured together, when the whole is subjected to the action of the vulcanizer, as is now commonly done. Having subjected the contents of the flask to the heat of the vulcanizer for sufficient length of time, the vulcanite rubber of plate, D, will unite with and adhere to the soft rubber, which results in forming the soft or flexible ridge, $d$, as indicated by dotted lines in Fig. 5.

The advantages of a soft rubber ridge on a vulcanite plate, to produce suction against the roof of the mouth, is well known.

What I claim as new, and desire to secure by Letters Patent, is—

1. The improved method of forming a soft rubber ridge upon a vulcanite dental plate, the same consisting in first forcing and compressing the soft non-vulcanizable rubber in the space intervening between the upper edge of the cast and its strengthening ring, and then applying the vulcanite material, as set forth.

2. The cast B provided with a strengthening ring C projecting outward and away from said cast around its outer top edge, for the purpose of forming a space into which the non-vulcanizable rubber is packed preparatory to casting the vulcanite plate, substantially as set forth.

LUCIUS ROBERTSON.

Witnesses:
HARRY F. KOKING,
O. M. HILL.